Figure 2:
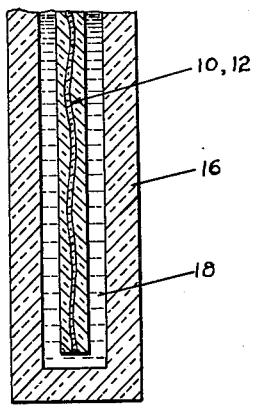

March 26, 1946. C. E. BARNES 2,397,231
PROCESS OF MANUFACTURING COATED LIGHT POLARIZERS
Filed Nov. 15, 1941

Carl E. Barnes
INVENTOR.
BY Donald L. Brown
Attorney

Patented Mar. 26, 1946

2,397,231

UNITED STATES PATENT OFFICE 2,397,231

PROCESS OF MANUFACTURING COATED LIGHT POLARIZERS

Carl E. Barnes, Acton, Mass., assignor to Polaroid Corporation, Dover, Del., a corporation of Delaware Application November 15, 1941, Serial No. 419,310

8 Claims. (Cl. 18—59)

This invention relates to a new and improved process of manufacturing light-polarizing bodies.

An object of the invention is to produce a light-polarizing sheet or film positioned within and substantially surrounded by a transparent, hard, polymerized resin permanently bonded to the polarizing film.

Other objects of the invention are to produce such an article of manufacture wherein the light-polarizing film comprises either a suspension of optically oriented, minute, light-polarizing particles in a transparent carrier such, for example, as a sheet or film of a transparent resin, or in which the dichroic polarizing film comprises a linear, hydrophilic, polymeric plastic having substantially oriented molecules, or in which the polarizing film comprises a plastic containing substantially oriented, long, straight-chain molecules having conjugated systems of double bonds.

Other objects of the invention are to produce an article of manufacture of the character described in which the hard, resinous, outer coating comprises highly polymerized methyl methacrylate, or in which the said coating comprises a highly polymerized vinyl compound, i. e., any monomeric compound containing an unsaturated methylene group, ($CH_2=$ ), or the like, or in which the said coating comprises interpolymers of said compounds which produce transparent polymers, or in which the said coating comprises a copolymer of a substance of the kind described with a hardening agent.

Other objects of the invention are to produce a product of the character described in which the highly polymerized, outer resin layers are bonded to the polarizing film with a urea-formaldehyde type resin or with an alkyd resin.

Other objects of the invention are to provide processes for the production of light-polarizing sheets of the character described wherein the outer coatings of highly polymerized, transparent, resinous materials are formed in situ about the light-polarizing film and wherein the polymerization of the outer layers is carried forward under such conditions that the light-polarizing layer or film is not affected by the process of polymerization.

A still further object of the invention is to provide a method of producing such an article wherein the index of refraction of the highly polymerized, resinous coatings substantially matches the index of refraction of the light-polarizing film for the transmitted component of incident light.

Other objects of the invention will in part be obvious and will in part appear hereinafter.

The invention accordingly comprises the several steps of the process, all as exemplified in the following detailed disclosure and the scope of the application of which will be indicated in the claims.

Figure 1:
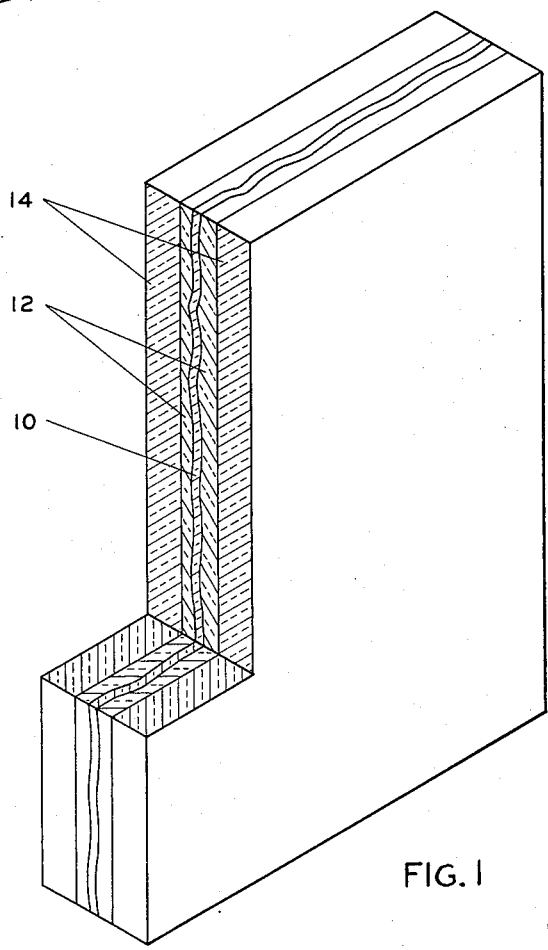

For a fuller understanding of the nature and objects of the invention, reference should be had to the following detailed description taken in connection with the accompanying drawing in which Fig. 1 illustrates in perspective a sectional view, greatly enlarged, of one product of the invention and Fig. 2 illustrates in a sectional view, greatly enlarged and with parts broken away, one way of carrying out the method of the invention.

Heretofore, many synthetic light-polarizing materials have been produced in sheet form. Among these may be mentioned, as typical, suspensions of optically oriented, needle-shaped, minute crystals of a light-polarizing substance such for example as herapathite in a light-transmitting hardened carrier, for example a carrier formed of a plastic material such as nitrocellulose, cellulose acetate, polyvinyl acetate or the like.

Other synthetic types of light-polarizing materials which have been produced in sheet form comprise sheets or films of a plastic material such for example as Cellophane, polyvinyl acetal, polyvinyl alcohol or other linear hydrophilic polymeric plastic, the molecules of which have been oriented to substantial parallelism, and which has then been subjected to a dye or stain as, for example, to a triiodide ion stain, a metallic stain or a direct cotton dye, or combinations thereof, which renders the sheet or film dichroic.

A still further type of synthetic polarizer which has been produced is illustrated by the material disclosed and claimed in United States Letters Patent to Land and Rogers, No. 2,173,304, which issued September 19, 1939. The light-polarizing material there disclosed comprises a transparent sheet of an organic plastic containing substantially oriented, long, straight-chain molecules having extended systems of conjugated double bonds, and more specifically such a plastic containing substantially oriented dehydrated molecules of polyvinyl alcohol.

This invention contemplates the use of any of the foregoing, or other suitable light-polarizing materials, and contemplates the provision of processes for intimately and permanently bonding the said material to or between layers of a highly polymerized, hard, transparent plastic. In a preferred embodiment of the invention, the polymerization of the outer, transparent plastic layers takes place in situ about the light-polarizing material under such circumstances that the outer surfaces of the plastic layers possess the optical properties of ground and polished glass.

The plastic materials which may satisfactorily be employed in the process of the present invention to produce a preferred product are diverse and varied, and include virtually all polymerizable, unsaturated methylene compounds. A preferred material is methyl methacrylate or a copolymer of methyl methacrylate with a suitable hardening agent. Other suitable materials for use in the process of the present invention to produce the hardened, highly polymerized outer coatings of the product of the invention are: ethyl methacrylate, isopropyl methacrylate, terbutyl methacrylate, etc.; cyclohexyl and p-cyclohexylphenyl methacrylate; the vinyl esters such as vinyl formate, vinyl acetate, vinyl propionate, and the vinyl ester of chloracetic acid (vinyl chloracetate), etc.; the vinyl ketones such as methyl vinyl ketone; styrene; furylethylene (vinyl furane). Other suitable materials are the esters of itaconic acid and the esters of methylene malonic acid. It is to be understood that the list of substances given is not exclusive but that it includes, with the materials listed hereinafter, the preferred substances for use in the present invention.

Intepolymers of any of the materials already listed, which are transparent when highly polymerized or which are miscible throughout the process of polymerization hereinafter described, are also suitable for use in the present invention. Examples of such interpolymers are: the interpolymer of methyl methacrylate and vinyl acetate; the interpolymer of methyl methacrylate and styrene; the interpolymer of styrene and furylethylene; the interpolymer of vinyl chloride and vinyl acetate; the interpolymer of vinyl acetate and styrene.

Copolymers of the substances first listed with suitable hardening agents may also satisfactorily be employed in the present invention. It is necessary that the hardening agent used give a transparent plastic when copolymerized with the base substance, i e., any of the substances first listed. It will be apparent that a vast number of suitable hardening agents may be employed. For example there may be employed with methyl methacrylate either free methacrylic acid up to about 30% by volume and preferably between 15% and 20% by volume, or free acrylic acid up to approximately 50% by volume and preferably approximately 30% by volume.

So also there may be employed with methyl methacrylate suitable amounts of: (a) the polyhydric alcohol esters of acrylic acid, alpha methylacrylic acid and alpha chloroacrylic acid; examples of suitable polyhydric alcohols being ethylene glycol, diethylene glycol and the polyethylene glycols; the hypothetical ethylidine glycol; glycerol and the sugar alcohols and sugars; pentaglycerol, pentaerythritol; dimethylol-propane, anhydroenneaheptitol, etc., (b) esters of acrylic, alpha methacrylic and alpha chloroacrylic acids with alcohols containing an unsaturated methylene group; examples of the unsaturated alcohols being allyl alcohol, alpha or beta methylallyl alcohol, and the hypothetical vinyl alcohol; (c) the nitriles, amides, substituted amides and anhydrides of acrylic, alpha methacrylic and alpha chloroacrylic acids; for example methacrylamide in a preferred volume of about 5% and methacrylic anhydride in a preferred volume of about 5% to 15%.

In addition to the hardening agents already mentioned for methyl methacrylate, others may be employed, for example divinyl ketone and divinyl benzene.

It will be understood that certain of the hardening agents which have been mentioned as suitable for use with methyl methacrylate may not be satisfactory for use with the other base materials, and certain of the hardening agents which function less satisfactorily with methyl methacrylate will be much more satisfactory with other of the base materials. In the latter category it may be mentioned that divinyl benzene, the last material listed above, is admirably adapted for use with styrene in the process of the present invention. In practicing the present invention it is necessary that the hardening agent employed form with the plastic selected for use in the process a hard, transparent copolymer when subjected to the process hereinafter to be described. When this test is applied it will be apparent which hardening agents may be employed with which of the base plastic materials.

It has been found that the light-polarizing layers or films employed in the present invention frequently adhere but lightly or not at all to the polymer formed about them. Accordingly it is one object of the present invention to supply a satisfactory adhesive or bonding layer between the light-polarizing film and the highly polymerized outer plastic layers so that a permanent bond is effected. Such an adhesive coating should be transparent in the thin films in which it is employed and should be substantially strain-free, i. e., it should show substantially no photoelastic strain.

Suitable adhesive compositions for use in the practice of the present invention may comprise most of the urea-formaldehyde type resins. A preferred adhesive is the material sold under the trade name "Polymerin." This material is understood to be essentially a solution of a modified urea-formaldehyde resin. The solution of the adhesive may be applied to the light-polarizing film or layer by flowing the adhesive onto the layer or by dipping the layer into the adhesive or in any other suitable manner, preferably at room temperature. The coated polarizing film is allowed to stand until most of the solvent for the adhesive has evaporated, when it is then baked, at a temperature above the boiling point of the solvent and below the temperature at which the polarizing film may be adversely affected, to drive out most of the residual solvent for the adhesive. It should be noted that while it is preferred to employ an adhesive coating which is substantially free from solvent, a wet adhesive may be used, and more specifically a solution of Polymerin may be employed, provided the solvent does not render cloudy the resin which is to be polymerized around the light-polarizing film. It is, however, easier to work with a dry, or substantially dry, sheet under all conditions.

It should be noted that the baked Polymerin film shows high water resistance. This property is distinctly advantageous if a light-polarizing film is to be employed which suffers deterioration upon contact with moisture, and if the polymerized resin surrounding such a light-polarizing film has low water resistance. Polymerin is not affected by the temperature at which the polymerization of the outer resin layers is carried forward, nor do any of the other conditions under which the process of the present invention is practiced adversely affect the properties of the adhesive or the light-polarizing layer.

While Polymerin and other urea-formaldehyde resins are preferred as adhesives for use in the process of the present invention, it is to be understood that any transparent resinous adhesive may be employed which will adhere both to the light-polarizing film and to the polymerized resinous outer layers. It is also, of course, to be understood that where the outer layers of highly polymerized resin bond directly to the light-polarizing film, the use of the intermediate adhesive layer may, if desired, be omitted and an autogenous bond may be secured between the resin forming the outer layers and the light-polarizing film.

A preferred light-polarizing material for use in the practice of the present invention is one comprising one form of the polyvinyl alcohol light-polarizing sheets already described, and a preferred resin for use in producing the highly polymerized outer layers is methyl methacrylate. When these materials are employed an autogenous bond is not secured and it is necessary to use an adhesive of the type already described.

Other adhesives may also be used, and more particularly most of the alkyd resins, for example glyceryl phthalate. Whatever the adhesive employed, it should be transparent in the thin film in which it is used.

It should be noted that neither the urea-formaldehyde type resin nor the alkyd resin is suitable to polymerize en masse around the light-polarizing sheet or film, for where relatively thick layers or sheets of these resins are formed and where the polymerization is carried forward to a point such as that desired in the present invention, severe strains are set up in the resin as the result of the shrinkage thereof during polymerization, and these strains show marked photoelastic effects.

In the preferred form of the invention the adhesive resin is maintained at least slightly plasticized either by the retention of a slight amount of residual solvent or by the addition of a small amount of a suitable plasticizer.

In addition to the resins already mentioned as suitable in the film of the adhesive layer, phenolic resins of the type used in making lacquers can satisfactorily be employed.

The drawing shows in perspective and in section a product made by the process of the present invention. The light-polarizing film or sheet 10 is illustrated as being bonded to the highly polymerized outer layers or sheets of resinous material 14 by the intermediate layers 12.

The drawing illustrates a condition which frequently arises in connection with the preparation of the product of the present invention. The light-polarizing sheet or film 10 and its adhesive layers 12 are shown as somewhat irregularly positioned along the approximate center of the composite sheet. It is neither necessary or desirable to take the steps necessary to insure that the light-polarizing layer and its adjacent adhesive layers remain absolutely flat and smooth during the polymerization of the outer resinous layers. If the index of refraction of the highly polymerized outer resinous layers is approximately that of the light-polarizing material, then the light-polarizing sheet or film becomes substantially invisible within the composite lamination even though it be slightly curved or wavy, as shown for example in the drawing.

If the outer surfaces of the highly polymerized plastic layers are maintained optically smooth, no lens effect is to be seen when an observer looks through the composite sheet even though the light-polarizing film itself is not smooth.

In the process of the present invention, the light-polarizing sheet 10, 12 (Fig. 2) coated with the adhesive layers—if an adhesive is to be employed—is suspended in the polymerizing mold 16, preferably about midway between the two side walls. The unpolymerized or partially polymerized resin composition 18 which is to form the outer layers of the composite sheet of the invention is then poured into the mold as a liquid or a viscous liquid surrounding the light-polarizing sheet or film.

Polymerization is then effected either by heating the resinous layers or by subjecting them to irradiation with ultra-violet light.

If polymerization is to be effected by heating, a temperature is mainained at between 40° C. and 100° C. until a solid is formed. In practice it is desirable to maintain the temperature below 80° C. and preferably between 55° C. and 65° C. It is, of course, to be understood that pure materials are to be employed in the process. Under these circumstances it is necessary to employ a polymerization catalyst. This may comprise an organic peroxide such as benzoyl peroxide, or other catalyst such as sulphur dioxide or certain of the metallic halides, for example aluminum chloride, zinc chloride or boron fluoride.

After a solid has been produced, the polymerization temperature is raised to a higher temperature, for example a temperature above the boiling point of any of the constituents of the resin being polymerized, for from eight to fifteen hours.

Where methyl methacrylate and a hardening agent are employed in the formation of the highly polymerized plastic layers, the finished product should preferably be stripped from the mold while it is still hot, although with some of the other resinous compositions the mold may be removed cold.

A preferred mold is one in which glass molding surfaces are provided at least adjacent those surfaces of the molded, polymerized plastic, which are to be optically smooth. If the inner surfaces of the glass mold are ground and/or polished to optical smoothness, the molded resin will possess the desired properties. In any event the character of the surface obtained on the highly polymerized, resinous layers will be substantially that of the inner surfaces of the mold.

The mold should preferably be water-jacketed so that the temperature of the resin during polymerization may be readily controlled by controlling the temperature of the water surrounding the mold.

It is frequently necessary, if a free cleavage is to be obtained between the polymerized resin and the mold, and particularly where the polymerized resin comprises methyl methacrylate and the mold is of glass, to provide a small percentage, for example from one-tenth of 1% to 1%, of a surface active compound in the resin being polymerized. Suitable surface active compounds for use when the resin comprises methyl methacrylate are stearic acid, or the material sold under the trade name "Aerosol OT," which comprises dioctyl sodium sulfosuccinate or the material sold under the trade name "Nacconol NRSF," which comprises a sodium alkyl aryl sulfonate. The quantities of the surface active material employed in the resin should preferably be kept low. A preferred amount is only that which is sufficient to insure a free cleavage between the resin and the glass. The use of excessive amounts of surface active material should be avoided to prevent cleavage between the polymerized resin and the adhesive layer surrounding the light-polarizing film.

Polymerization may be effected by irradiating the resinous compounds with ultra-violet light, although if an exceedingly hard final product is desired it may be necessary to subject the polymerized material to a final heating process of the type described in connection with the process of polymerization by heating. It should be noted that where polymerization is accomplished by the use of ultra-violet radiation, all contact of the resin with air should be avoided as oxygen acts as an inhibitor of polymerization.

It will of course be understood that although the product shown in the drawing comprises a composite sheet having flat, smooth, outer surfaces, the production of sheets or films having curved outer surfaces may be readily accomplished by the use of suitable molds. In this manner lenses of many types may be produced comprising outer layers of a hard, highly polymerized, resinous material and a substantially centrally disposed layer or film of light-polarizing material. Under certain circumstances it may be possible to grind and polish the outer surfaces of such lenses to conform to any desired optical prescription.

So also, it is to be understood that the light-polarizing sheet or film need not be centrally disposed but may be positioned adjacent either surface of the composite sheet. It may, for example, be desirable to produce a blank, as for use in connection with the production of light-polarizing plastic lenses, which may have a relatively thick heavy layer of polymerized resinous material adherent to one surface of the light-polarizing sheet, and a relatively thin layer adherent to the opposite surface thereof. The latter layer may be molded to a predetermined curvature while the former layer may be molded with a flat surface, so that it may later be ground and polished to complete the desired lens of the assembly.

It will be understood that the index of refraction of the highly polymerized, resinous layers may be altered within reasonable limits to coincide substantially with the index of refraction of the light-polarizing film for light transmitted thereby. This may be accomplished by the copolymerization of different ones of the resinous materials already mentioned. For example, styrene possesses the highest index of refraction and vinyl acetate the lowest index of refraction of those materials previously described. If it is desired to lower the index of methyl methacrylate, for example, to coincide with the index of the light-polarizing sheet or film employed, a sufficient amount of vinyl acetate may be copolymerized with the methyl methacrylate to produce the desired result. If it is desired to raise the index of methyl methacrylate, for example, to match that of the light-polarizing sheet or film employed, a sufficient amount of styrene may be copolymerized with the methyl methacrylate, or triphenylmethylmethacrylate may be used in lieu of styrene. Many other substances may also be employed for altering the index of refraction of the polymerized layers. These materials should not render the layer translucent or opaque but should preferably give as a final product a transparent, uncloudy material. Suitable substances are triphenyl benzene, hexachlordiphenyl oxide, polystyrene, etc.

Much of the description of the invention has been given in connection with the use of methyl methacrylate as the resin to be polymerized. While methyl methacrylate is a preferred material for use in the process of the invention, it is of course to be understood that other materials such as those initially mentioned may be employed and, with the use of such other materials, modifications in the process may be preferred. Such modifications will be understood by those skilled in the art from the descriptions and instruction already given.

Since certain changes in carrying out the above method may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. The process comprising coating a sheet of light-polarizing, plastic material with a relatively thin layer of a light-transmitting, adhesive material, then applying to said sheet a coating of a polymerizable, light-transmitting resin and polymerizing said coating in situ around said sheet.

2. The process comprising coating a sheet of light-polarizing, plastic material with a relatively thin layer of a light-transmitting resin of the class consisting of the urea-formaldehyde and phenol-formaldehyde type resins and the alkyd resins, then applying to said sheet a coating of a polymerizable, light-transmitting resin and polymerizing said coating in situ around said sheet.

3. The process comprising coating a sheet of light-polarizing, plastic material with a relatively thin layer of a light-transmitting, adhesive material, positioning said sheet within a mold and in spaced relation with the walls thereof, filling the remainder of said mold with a polymerizable, light-transmitting resin, and polymerizing said resin around said sheet.

4. The process comprising coating a sheet of light-polarizing, plastic material with a relatively thin layer of a light-transmitting, adhesive material, positioning said sheet within a mold and in spaced relation with the walls thereof, filling the remainder of said mold with a polymerizable, light-transmitting resin, adding to said resin a sufficient amount of a surface-active compound to permit ready cleavage between said mold and said resin after polymerization thereof, and polymerizing said resin around said sheet.

5. A method of the class described which consists in coating a sheet of light-polarizing plastic material with a relatively thin layer of light transmitting resin of the class consisting of the urea formaldehyde and phenol formaldehyde type resins and the alkyd resins, suspending the composite sheet thus produced within a mold comprising a pair of parallel, smooth-surfaced, internal walls, said sheet extending between said walls, filling the remainder of said mold with a polymerizable, light-transmitting mass, adding to said mass a sufficient amount of a surface active compound to permit ready cleavage between said mold and said mass after the polymerization thereof, and polymerizing said mass around said sheet.

6. The process comprising coating a sheet of light-transmitting plastic material with a relatively thin layer of a light-transmitting adhesive material, then applying to said sheet a coating of a polymerizable light-transmitting resin, and polymerizing said coating in situ around said sheet.

7. The process comprising coating a sheet of light-transmitting plastic material with a relatively thin layer of a light-transmitting adhesive material, positioning said sheet within a mold and in spaced relation with the walls thereof, filling the remainder of said mold with a polymerizable light-transmitting resin, and polymerizing said resin around said sheet.

8. The process comprising coating a sheet of light-polarizing plastic material with a relatively thin layer of a light-transmitting adhesive material, positioning said sheet within a mold and in spaced relation with the walls thereof, filling the remainder of said mold with a polymerizable light-transmitting resin, adding to said resin a sufficient amount of a surface-active compound to permit ready cleavage between said mold and said resin after polymerization thereof, and polymerizing said resin around said sheet.

CARL E. BARNES.